United States Patent Office 3,405,434
Patented Oct. 15, 1968

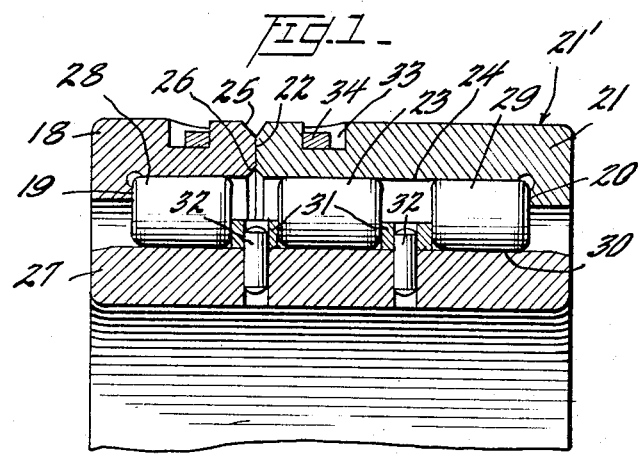
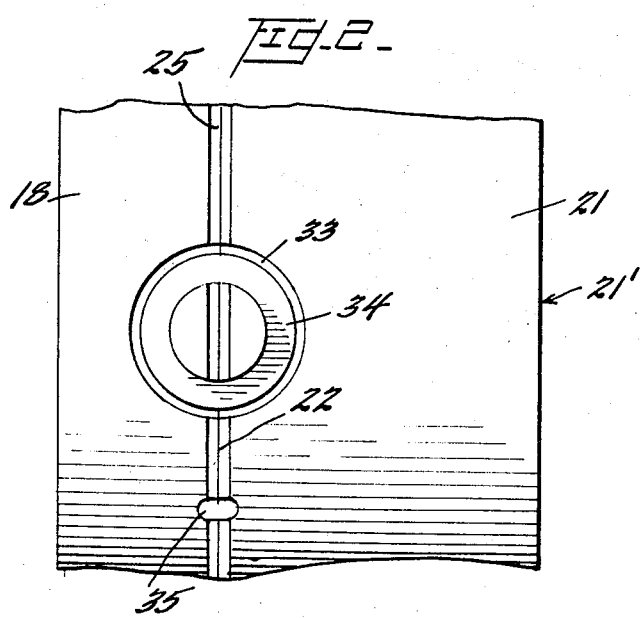

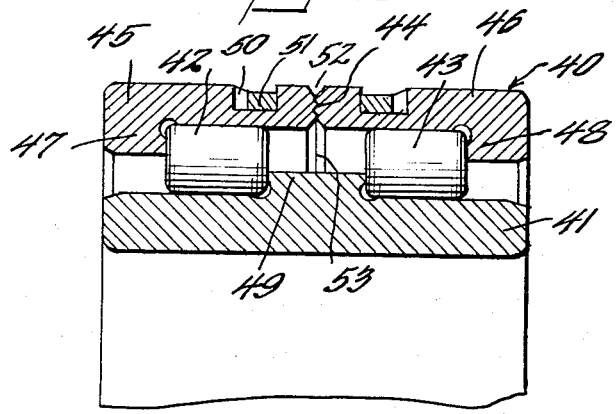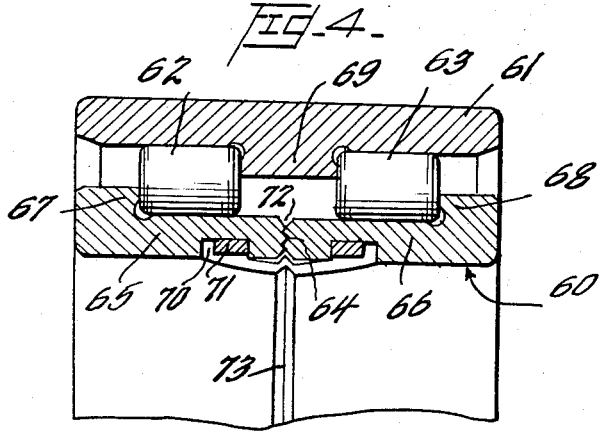

3,405,434
MULTI-ROW CYLINDRICAL ROLLER BEARINGS
Walter Hoffman, Herzogenaurach, near Nurnberg, and Werner Jacob, Frankfurt am Main, Germany, assignors to Industriewerk Schaeffler O.H.G., Herzogenaurach, near Nurnberg, Germany
Application May 22, 1964, Ser. No. 369,444, now Patent No. 3,302,987, dated Feb. 7, 1967, which is a continuation-in-part of abandoned application Ser. No. 79,657, dated Dec. 30, 1960. Divided and this application Oct. 11, 1966, Ser. No. 585,865
Claims priority, application Germany, Jan. 4, 1960, I 17,483
5 Claims. (Cl. 29—148.4)

This application is a division of the co-pending application Ser. No. 369,444, filed May 22, 1964, now Patent No. 3,302,987, granted Feb. 7, 1967, and which latter is a continuation-in-part of application Ser. No. 79,657, filed Dec. 30, 1960, now abandoned.

Multi-row cylindrical roller bearings generally have rollers which are free, such bearings are therefore suitable for accepting radially acting forces but not axially acting forces. The roller elements are guided between rims on the inner or outer race. If multi-row cylindrical roller bearings are also to be used for transmitting axial forces, rims must be arranged both on the inner and on the outer race. The use of loose rim discs or angle rings is also possible. The lateral rims can be connected fast to the races after being inserted therein, but this entails considerable manufacturing difficulties since it is a question of hardened parts which have to be first of all provided with bores, screw-threads, grooves, etc., which may become distorted under heat treatment.

With cylindrical roller bearings, the rolling elements are guided with slight lateral play between rims. Therefore, in the case of multi-row cylindrical roller bearings which are adapted to accept axial forces also, it is necessary to manufacture the parts with extreme accuracy. But since this is particularly difficult, the individual parts often have to be subsequently processed, wherever this may still be possible. This kind of manufacturing process and assembly is very expensive and time-wasting.

It is an object of the invention to provide a method for producing a roller bearing which will withstand axial forces in a single row of cylindrical rollers and which can be produced with great accuracy in such a way that the raceways of the individual rows of rollers will accommodate roller elements which are identical to one another so that rollers of the same category may be used throughout a single bearing.

A further object of the invention resides in a method to produce bearings which comprises making both raceways each in one piece, prizing one of the raceways which has the lateral edge rims into two parts by breaking the parts apart at a weakened section extending perpendicularly to the axis of the bearing at a parting joint, placing the rollers in rows on both sides of the raceway with the rim between and then placing the two prized raceways together on the rollers, and finally welding the two parts of the prized raceways together at the prized parting joint.

For a better understanding of the invention and to show how the same may be carried into effect, reference may now be made, by way of example, to the accompanying drawing, in which:

FIG. 1 is an axial sectional view of a three-row cylindrical roller bearing;

FIG. 2 is a side view of part of the bearing according to FIG. 1;

FIG. 3 is an axial sectional view of a modified roller bearing; and

FIG. 4 is an axial sectional view of another modified roller bearing.

The drawing shows a three-row cylindrical roller bearing having an outer race 21' which is divided at right angles to its longitudinal axis into two parts 18 and 21, the parts abutting along a joint 22. The joint 22 is not arranged centrally of the race 21' but in a position axially displaced from the center of the race in order that a central row of rollers 23 can roll on an uninterrupted outer raceway 24. The outer race 18 and 21 has a groove 25 in its outer surface and a corresponding groove 26 in the outer raceways 18 and 21. This arrangement weakens the cross-section of the race 21' and predetermines the position of the joint 22 at which it is desired to separate or prize the outer race 21' into two parts. An inner race 27 is provided with rims for guiding the rows of rollers 23, 28 and 29 by way of rings 31 which are pressed on to the smooth continuous raceway 30 of the race 27 and are fastened by several circumferentially spaced pins 32. As shown in FIG. 2, the outer surface of the outer races 18 and 21, which is provided with the annular groove 25, is also provided with grooves 33 and containing rings 34. The annular groove 25 is interrupted at several points along its circumferential length by holes 35 into which conical pins are driven in order to force the race 21' open when the two parts 18 and 21 are prized apart.

The grooves 25 and 26 and the holes 35 can serve to convey lubricant to the rollers.

As shown in FIG. 1, the outer race part 18 is provided with a shoulder or circumferential abutment rim 19 against which the row of rollers 28 abut and a second shoulder 20 is provided on the outer race part 21 against which the row of rollers 29 abut.

The illustrated form of embodiment makes it possible to provide multi-row cylindrical roller bearings which are capable of accepting axial forces. These bearings can be produced with cages or may also be of the cageless type. The self-supporting construction with smooth continuous raceways and a race which can be forced open is particularly advantageous since the raceways for the individual rows of rollers are identical to one another in absolute dimensions and thus, rolling elements of the same category can be used throughout a single bearing.

As to the method of manufacturing the multi-row cylindrical roller bearings, the various steps may be followed in which both race rings 21' and 27 are each made in one piece and the racing ring with the edge rims, which is the outer race ring 21', is prized into two parts by breaking the parts 21 and 18 apart at a weakened section 22, which extends perpendicular to the axis of the bearing at a parting joint. The rings 31 are mounted on the inner race ring 27 by means of pins 32 and then the rollers in three rows 23, 28 and 29 are placed on a smooth continuous raceway 30 and finally the two parts 18 and 21 are secured together by placing rings 34 in the grooves 33 around the projecting portions of each ring part in order to hold the two parts together. The prizing of the two parts 18 and 21 is facilitated by means of the grooves 25 and 26 and also, the means of the radial holes, of which one is shown at 35 in FIG. 2, by insertion of a pin or tool into each hole 35 and this will aid in prizing the two parts apart.

Referring now to the roller bearing of FIG. 3, there is provided an outer race ring 40, an inner race ring 41 and two rows of rollers 42 and 43. The outer race ring 40 is made in one piece and is prized apart at the joint 44 into two parts 45 and 46 to assemble the bearing. The outer race ring 40 at its two axial ends, is provided with rims 47 and 48; and the inner race ring 41 is provided at its middle portion with a fixed rim 49 between the roller rows 42 and 43. The two parts 45 and 46 of the outer race ring 40 are held or secured together by means of grooves 50 in which rings 51 are secured, there being preferably a plurality of spaced rings 51. To facilitate the prizing of the two parts 45 and 46, circumferential grooves 52 and 53 are provided to weaken the outer ring 40 at the parting joint 44. In FIG. 3, which has the two rims 47 and 48, it is only possible to manufacture the bearing by prizing the ring 40 at 44 into two parts 45 and 46, since thus, it is possible to insert the two rows of rollers 42 and 43 on the inner ring 41 in such a way that both rows of rollers 42 and 43 will abut against the rim 49. In this way both parts 45 and 46 can be axially moved over the inner ring 41 until the rims 47 and 48 will abut against the rows of rollers. Then the two parts 45 and 46 are secured together by means of the rings 51.

FIG. 4 shows a bearing which differs from the bearing of FIG. 3 in the outer ring 6 has a single internal rim 69 centrally located and between the rows of rollers 62 and 63 and the inner ring 60 has end rims 67 and 68 to abut against the rows of rollers 62 and 63 respectively. The inner ring 60 has the two parts 65 and 66 which are prized apart at 64 and to facilitate separation of the two parts grooves 72 and 73 are provided. Securing ring 71 will hold the two parts 65 and 66 together.

The rims 47, 48 and 49 of FIG. 3 and the rims 67, 68 and 69 are preferably made integral with the inner and outer rings.

We claim as our invention:

1. A method of manufacturing a multi-row cylindrical roller bearing having rollers guided between rims on raceways and one of the raceways having lateral edge rims along the rollers to be guided between the edge rims and the other raceway having a rim between adjacent rows of rollers, comprising making both raceways each in one piece, prizing the one of the raceways which has the lateral edge rims into two parts by breaking the parts apart at a weakened section extending perpendicularly to the axis of the bearing at a parting joint, placing the rollers in rows on one of the raceways with the rim between and then placing the two prized raceways together on the rollers, and finally securely clamping the two parts of the prized raceways together at the prized parting joint.

2. A method as claimed in claim 1, wherein said one raceway is formed with an annular peripheral groove at said weakened section and with radial holes at intervals around said groove, and wherein said one raceway is broken into said two parts by means of pins forced into said holes.

3. A method as claimed in claim 1, wherein said one raceway is formed at said weakened section with annular grooves in its inner and outer peripheries and with radial holes at intervals around said grooves, and wherein said one race is broken into said two parts by means of pins forced into said holes.

4. A method of manufacturing a roller bearing having an outer race and an inner race with rows of cylindrical rollers therebetween and rims on the races with one race having edge rims, comprising making both race rings each in one piece and providing one race ring with edge rims and the other race ring with a central rim, prizing the race ring with the edge rims into two parts in a plane perpendicular to the axis of the bearing, inserting two rows of rollers between the race rings and placing the prized two parts together so that the rows of rollers will abut against the rims on both races, and finally securing the two prized parts to each other.

5. A method of manufacturing a multi-row cylindrical roller bearing having rollers guided between rims on raceways, one of the races having lateral rims and the other race having a rim situated between each adjacent pair of rows of rollers, the method comprising the steps of producing the one race in one piece and then dividing it into two parts by breaking it apart at a weakened section extending perpendicularly to the axis of the bearing, and subsequently reuniting the two parts with the rollers positioned between the rims, and finally securing the two parts together by clamping means.

References Cited
UNITED STATES PATENTS

| | | | |
|---|---|---|---|
| 1,498,748 | 6/1924 | Pierce | 29—148.4 |
| 2,624,105 | 1/1953 | Virtue | 29—148.4 |
| 2,648,578 | 8/1953 | Stearns et al. | 308—196 |
| 2,657,105 | 10/1953 | Stearns | 308—196 |
| 2,702,216 | 2/1955 | Stearns | 29—413 X |

FOREIGN PATENTS

| | | |
|---|---|---|
| 292,108 | 2/1929 | Great Britain. |
| 29,855 | 11/1903 | Switzerland. |

THOMAS H. EAGER, *Primary Examiner.*